(12) United States Patent
Betz

(10) Patent No.: US 9,710,549 B2
(45) Date of Patent: Jul. 18, 2017

(54) ENTITY NORMALIZATION VIA NAME NORMALIZATION

(71) Applicant: Google Inc., Mountain View, CA (US)

(72) Inventor: Jonathan T. Betz, Summit, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/229,774

(22) Filed: Mar. 28, 2014

(65) Prior Publication Data

US 2014/0214778 A1 Jul. 31, 2014

Related U.S. Application Data

(63) Continuation of application No. 11/394,508, filed on Mar. 31, 2006, now Pat. No. 8,700,568, which is a continuation-in-part of application No. 11/356,838, filed on Feb. 17, 2006, now Pat. No. 7,672,971.

(51) Int. Cl.
*G06F 17/30* (2006.01)

(52) U.S. Cl.
CPC .. *G06F 17/30696* (2013.01); *G06F 17/30156* (2013.01); *G06F 17/30303* (2013.01); *G06F 17/30533* (2013.01); *G06F 17/30578* (2013.01)

(58) Field of Classification Search
CPC .................. G06F 17/30696; G06F 17/30991
USPC ........................................................ 707/704
See application file for complete search history.

(56) References Cited

U.S. PATENT DOCUMENTS

| | | |
|---|---|---|
| 5,010,478 A | 4/1991 | Deran |
| 5,133,075 A | 7/1992 | Risch |
| 5,347,653 A | 9/1994 | Flynn et al. |
| 5,440,730 A | 8/1995 | Elmasri et al. |
| 5,475,819 A | 12/1995 | Miller et al. |

(Continued)

FOREIGN PATENT DOCUMENTS

| | | |
|---|---|---|
| JP | 5-174020 A | 7/1993 |
| WO | WO 01/27713 A2 | 4/2001 |

(Continued)

OTHER PUBLICATIONS

Agichtein, Snowball Extracting relations from large plain-text collections, Dec. 1999, 13 pgs.

(Continued)

*Primary Examiner* — Shahid Alam
(74) *Attorney, Agent, or Firm* — Brake Hughes Bellermann LLP

(57) ABSTRACT

Systems and methods for normalizing entities via name normalization are disclosed. In some implementations, a computer-implemented method of identifying duplicate objects in a plurality of objects is provided. Each object in the plurality of objects is associated with one or more facts, and each of the one or more facts having a value. The method includes: using a computer processor to perform: associating facts extracted from web documents with a plurality of objects; and for each of the plurality of objects, normalizing the value of a name fact, the name fact being among one or more facts associated with the object; processing the plurality of objects in accordance with the normalized value of the name facts of the plurality of objects. In some implementations, normalizing the value of the name fact is optionally carried out by applying a group of normalization rules to the value of the name fact.

18 Claims, 9 Drawing Sheets

(56) References Cited

U.S. PATENT DOCUMENTS

| | | |
|---|---|---|
| 5,519,608 A | 5/1996 | Kupiec |
| 5,560,005 A | 9/1996 | Hoover et al. |
| 5,574,898 A | 11/1996 | Leblang et al. |
| 5,680,622 A | 10/1997 | Even |
| 5,694,590 A | 12/1997 | Thuraisingham et al. |
| 5,701,470 A | 12/1997 | Joy et al. |
| 5,717,911 A | 2/1998 | Madrid et al. |
| 5,717,951 A | 2/1998 | Yabumoto |
| 5,778,378 A | 7/1998 | Rubin |
| 5,787,413 A | 7/1998 | Kauffman et al. |
| 5,793,966 A | 8/1998 | Amstein |
| 5,802,299 A | 9/1998 | Logan et al. |
| 5,815,415 A | 9/1998 | Bentley et al. |
| 5,819,210 A | 10/1998 | Maxwell, III et al. |
| 5,819,265 A | 10/1998 | Ravin et al. |
| 5,822,743 A | 10/1998 | Gupta et al. |
| 5,826,258 A | 10/1998 | Gupta et al. |
| 5,838,979 A | 11/1998 | Hart et al. |
| 5,909,689 A | 6/1999 | Van Ryzin |
| 5,920,859 A | 7/1999 | Li |
| 5,943,670 A | 8/1999 | Prager |
| 5,956,718 A | 9/1999 | Prasad et al. |
| 5,974,254 A | 10/1999 | Hsu |
| 5,987,460 A | 11/1999 | Niwa et al. |
| 6,018,741 A | 1/2000 | Howland et al. |
| 6,044,366 A | 3/2000 | Graffe et al. |
| 6,052,693 A | 4/2000 | Smith et al. |
| 6,078,918 A | 6/2000 | Allen et al. |
| 6,112,203 A | 8/2000 | Bharat et al. |
| 6,112,210 A | 8/2000 | Nori et al. |
| 6,122,647 A | 9/2000 | Horowitz et al. |
| 6,134,555 A | 10/2000 | Chadha et al. |
| 6,138,270 A | 10/2000 | Hsu |
| 6,173,275 B1 * | 1/2001 | Caid ............... G06F 17/30256 |
| | | 382/190 |
| 6,212,526 B1 | 4/2001 | Chaudhuri et al. |
| 6,240,546 B1 | 5/2001 | Lee et al. |
| 6,263,328 B1 | 7/2001 | Coden et al. |
| 6,285,999 B1 | 9/2001 | Page |
| 6,289,338 B1 | 9/2001 | Stoffel et al. |
| 6,311,194 B1 | 10/2001 | Sheth et al. |
| 6,327,574 B1 | 12/2001 | Kramer et al. |
| 6,349,275 B1 | 2/2002 | Schumacher et al. |
| 6,377,943 B1 | 4/2002 | Jakobsson |
| 6,397,228 B1 | 5/2002 | Lamburt et al. |
| 6,473,898 B1 | 10/2002 | Waugh et al. |
| 6,502,102 B1 | 12/2002 | Haswell et al. |
| 6,556,991 B1 | 4/2003 | Borkovsky |
| 6,567,936 B1 | 5/2003 | Yang et al. |
| 6,572,661 B1 | 6/2003 | Stern |
| 6,584,464 B1 | 6/2003 | Warthen |
| 6,606,625 B1 | 8/2003 | Muslea et al. |
| 6,606,659 B1 | 8/2003 | Hegli et al. |
| 6,609,123 B1 | 8/2003 | Cazemier et al. |
| 6,656,991 B2 | 12/2003 | Staccione et al. |
| 6,665,659 B1 | 12/2003 | Logan |
| 6,665,666 B1 | 12/2003 | Brown et al. |
| 6,665,837 B1 | 12/2003 | Dean et al. |
| 6,745,189 B2 | 6/2004 | Schreiber |
| 6,754,873 B1 | 6/2004 | Law et al. |
| 6,799,176 B1 | 9/2004 | Page |
| 6,804,667 B1 | 10/2004 | Martin |
| 6,820,081 B1 | 11/2004 | Kawai et al. |
| 6,820,093 B2 | 11/2004 | de la Huerga |
| 6,823,495 B1 | 11/2004 | Vedula et al. |
| 6,850,896 B1 | 2/2005 | Kelman et al. |
| 6,886,005 B2 | 4/2005 | Davis |
| 6,901,403 B1 | 5/2005 | Bata et al. |
| 6,957,213 B1 | 10/2005 | Yuret |
| 6,963,880 B1 | 11/2005 | Pingte et al. |
| 7,003,522 B1 | 2/2006 | Reynar et al. |
| 7,003,719 B1 | 2/2006 | Rosenoff et al. |
| 7,020,662 B2 | 3/2006 | Boreham et al. |
| 7,051,023 B2 | 5/2006 | Kapur et al. |
| 7,080,073 B1 | 7/2006 | Jiang et al. |
| 7,080,085 B1 | 7/2006 | Choy et al. |
| 7,143,099 B2 | 11/2006 | Lecheler-Moore et al. |
| 7,146,536 B2 | 12/2006 | Bingham et al. |
| 7,162,499 B2 | 1/2007 | Lees et al. |
| 7,194,380 B2 | 3/2007 | Barrow et al. |
| 7,197,449 B2 | 3/2007 | Hu et al. |
| 7,277,879 B2 | 10/2007 | Varadarajan |
| 7,305,380 B1 | 12/2007 | Hoelzle et al. |
| 7,363,312 B2 | 4/2008 | Goldsack |
| 7,472,182 B1 | 12/2008 | Young et al. |
| 7,483,829 B2 | 1/2009 | Murakami et al. |
| 7,493,317 B2 | 2/2009 | Geva |
| 7,610,382 B1 | 10/2009 | Siegel |
| 7,672,971 B2 * | 3/2010 | Betz ............... G06F 17/30533 |
| | | 707/748 |
| 7,747,571 B2 | 6/2010 | Boggs |
| 7,797,282 B1 | 9/2010 | Kirshenbaum et al. |
| 7,953,720 B1 * | 5/2011 | Rohde ............... G06F 17/30864 |
| | | 707/706 |
| 2002/0038307 A1 | 3/2002 | Obradovic et al. |
| 2002/0042707 A1 | 4/2002 | Zhao et al. |
| 2002/0065845 A1 | 5/2002 | Naito et al. |
| 2002/0073115 A1 | 6/2002 | Davis |
| 2002/0083039 A1 | 6/2002 | Ferrari et al. |
| 2002/0087567 A1 | 7/2002 | Spiegler et al. |
| 2002/0147738 A1 | 10/2002 | Reader |
| 2002/0169730 A1 | 11/2002 | Lazaridis |
| 2002/0169770 A1 | 11/2002 | Kim et al. |
| 2002/0178448 A1 | 11/2002 | Te Kiefte et al. |
| 2002/0194172 A1 | 12/2002 | Schreiber |
| 2003/0018652 A1 | 1/2003 | Heckerman et al. |
| 2003/0058706 A1 | 3/2003 | Okamoto et al. |
| 2003/0078902 A1 | 4/2003 | Leong et al. |
| 2003/0120644 A1 | 6/2003 | Shirota |
| 2003/0120670 A1 * | 6/2003 | Nareddy ............... G06Q 30/02 |
| | | 707/704 |
| 2003/0120675 A1 | 6/2003 | Stauber et al. |
| 2003/0126102 A1 | 7/2003 | Borthwick |
| 2003/0149567 A1 | 8/2003 | Schmitz et al. |
| 2003/0154071 A1 | 8/2003 | Shreve |
| 2003/0177110 A1 | 9/2003 | Okamoto et al. |
| 2003/0182310 A1 | 9/2003 | Charnock et al. |
| 2003/0195877 A1 | 10/2003 | Ford et al. |
| 2003/0196052 A1 | 10/2003 | Bolik et al. |
| 2004/0003067 A1 | 1/2004 | Ferrin |
| 2004/0024739 A1 | 2/2004 | Copperman et al. |
| 2004/0049499 A1 * | 3/2004 | Nomoto ............ G06F 17/30654 |
| | | 707/669 |
| 2004/0064447 A1 | 4/2004 | Simske et al. |
| 2004/0088292 A1 | 5/2004 | Dettinger et al. |
| 2004/0107125 A1 | 6/2004 | Guheen et al. |
| 2004/0107205 A1 * | 6/2004 | Burdick ............ G06F 17/30303 |
| | | 707/802 |
| 2004/0122844 A1 | 6/2004 | Malloy et al. |
| 2004/0123240 A1 | 6/2004 | Gerstl et al. |
| 2004/0128624 A1 | 7/2004 | Arellano et al. |
| 2004/0143600 A1 | 7/2004 | Musgrove et al. |
| 2004/0153456 A1 | 8/2004 | Charnock et al. |
| 2004/0167870 A1 | 8/2004 | Wakefield et al. |
| 2004/0177015 A1 | 9/2004 | Galai et al. |
| 2004/0199923 A1 | 10/2004 | Russek |
| 2004/0240542 A1 | 12/2004 | Yeredor et al. |
| 2004/0255237 A1 | 12/2004 | Tong |
| 2004/0260979 A1 | 12/2004 | Kumai |
| 2004/0267700 A1 | 12/2004 | Dumais et al. |
| 2005/0055399 A1 * | 3/2005 | Savchuk ............ H04L 63/1416 |
| | | 709/203 |
| 2005/0076012 A1 | 4/2005 | Manber et al. |
| 2005/0086211 A1 | 4/2005 | Mayer |
| 2005/0086222 A1 | 4/2005 | Wang et al. |
| 2005/0089223 A1 * | 4/2005 | Krumm ............... G06K 9/00228 |
| | | 382/170 |
| 2005/0097150 A1 | 5/2005 | McKeon et al. |
| 2005/0125311 A1 | 6/2005 | Chidiac et al. |
| 2005/0149576 A1 | 7/2005 | Marmaros et al. |
| 2005/0149851 A1 | 7/2005 | Mittal |
| 2005/0187923 A1 | 8/2005 | Cipollone |
| 2005/0240615 A1 | 10/2005 | Barness et al. |
| 2005/0256825 A1 | 11/2005 | Dettinger et al. |

(56) References Cited

U.S. PATENT DOCUMENTS

| | | | |
|---|---|---|---|
| 2005/0288982 A1* | 12/2005 | Konno | G06Q 30/0623 705/26.61 |
| 2006/0026122 A1 | 2/2006 | Hurwood et al. | |
| 2006/0036504 A1 | 2/2006 | Allocca et al. | |
| 2006/0036686 A1* | 2/2006 | Shimogori | H04L 67/24 709/204 |
| 2006/0041597 A1 | 2/2006 | Conrad et al. | |
| 2006/0047838 A1 | 3/2006 | Chauhan | |
| 2006/0053171 A1 | 3/2006 | Eldridge et al. | |
| 2006/0053175 A1 | 3/2006 | Gardner et al. | |
| 2006/0074824 A1 | 4/2006 | Li | |
| 2006/0074910 A1 | 4/2006 | Yun et al. | |
| 2006/0085465 A1 | 4/2006 | Nori et al. | |
| 2006/0085755 A1* | 4/2006 | Arai | G06F 17/241 715/764 |
| 2006/0136585 A1 | 6/2006 | Mayfield et al. | |
| 2006/0143227 A1 | 6/2006 | Helm et al. | |
| 2006/0143603 A1 | 6/2006 | Kalthoff et al. | |
| 2006/0152755 A1 | 7/2006 | Curtis et al. | |
| 2006/0167991 A1 | 7/2006 | Heikes et al. | |
| 2006/0178848 A1* | 8/2006 | Ilzuka | G06F 9/5044 702/63 |
| 2006/0224582 A1* | 10/2006 | Hogue | G06F 17/30864 707/749 |
| 2006/0238919 A1 | 10/2006 | Bradley et al. | |
| 2006/0248045 A1 | 11/2006 | Toledano et al. | |
| 2006/0248456 A1 | 11/2006 | Bender et al. | |
| 2006/0253418 A1 | 11/2006 | Charnock et al. | |
| 2006/0288268 A1 | 12/2006 | Srinivasan et al. | |
| 2006/0293879 A1 | 12/2006 | Zhao et al. | |
| 2007/0005593 A1 | 1/2007 | Self et al. | |
| 2007/0005639 A1 | 1/2007 | Gaussier et al. | |
| 2007/0016890 A1 | 1/2007 | Brunner et al. | |
| 2007/0038610 A1 | 2/2007 | Omoigui | |
| 2007/0073768 A1 | 3/2007 | Goradia | |
| 2007/0094246 A1 | 4/2007 | Dill et al. | |
| 2007/0130123 A1 | 6/2007 | Majumder | |
| 2007/0143317 A1 | 6/2007 | Hogue et al. | |
| 2007/0150800 A1 | 6/2007 | Betz et al. | |
| 2007/0198480 A1 | 8/2007 | Hogue et al. | |
| 2007/0198481 A1 | 8/2007 | Hogue et al. | |
| 2007/0203867 A1 | 8/2007 | Hogue et al. | |
| 2007/0240031 A1 | 10/2007 | Zhao | |
| 2007/0271268 A1 | 11/2007 | Fontoura et al. | |
| 2008/0071739 A1 | 3/2008 | Kumar et al. | |
| 2008/0127211 A1 | 5/2008 | Belsey et al. | |
| 2009/0006359 A1 | 1/2009 | Liao | |

FOREIGN PATENT DOCUMENTS

| | | |
|---|---|---|
| WO | WO 2004/114163 A2 | 12/2004 |
| WO | WO 2006/104951 A1 | 10/2006 |

OTHER PUBLICATIONS

Andritsos: Information-theoretic tools for mining database structure from large data sets, ACM SIGMOD, Jun. 13-18, 2004, 12 pgs.

Betz, Decision on Appeal, U.S. Appl. No. 11/394,508, Sep. 11, 2013, 8 pgs.

Betz, Examiner's Answer, U.S. Appl. No. 11/394,508, Aug. 20, 2010, 28 pgs.

Betz, Final Office Action, U.S. Appl. No. 13/585,775, Apr. 9, 2014, 13 pgs.

Betz, Notice of Allowance, U.S. Appl. No. 11/394,508, Nov. 27, 2013, 7 pgs.

Betz, Office Action, U.S. Appl. No. 11/142,740, Aug. 13, 2007, 12 pgs.

Betz, Office Action, U.S. Appl. No. 11/142,740, May 17, 2007, 12 pgs.

Betz, Office Action, U.S. Appl. No. 11/142,740, Jul. 23, 2008, 11 pgs.

Betz, Office Action, U.S. Appl. No. 11/142,740, Dec. 26, 2007, 12 pgs.

Betz, Office Action, U.S. Appl. No. 11/142,740, Jan. 27, 2009, 11 pgs.

Betz, Office Action, U.S. Appl. No. 11/142,740, Apr. 30, 2008, 14 pgs.

Betz, Office Action, U.S. Appl. No. 11/356,765, Feb. 4, 2009, 16 pgs.

Betz, Office Action, U.S. Appl. No. 11/356,765, Aug. 5, 2009, 16 pgs.

Betz, Office Action, U.S. Appl. No. 11/356,765, Aug. 9, 2011, 20 pgs.

Betz, Office Action, U.S. Appl. No. 11/356,765, Aug. 21, 2008, 16 pgs.

Betz, Office Action, U.S. Appl. No. 11/356,765, Feb. 21, 2008, 12 pgs.

Betz, Office Action, U.S. Appl. No. 11/356,838, May 12, 2009, 14 pgs.

Betz, Office Action, U.S. Appl. No. 11/356,838, Mar. 19, 2008, 12 pgs.

Betz, Office Action, U.S. Appl. No. 11/356,838, Sep. 30, 2008, 15 pgs.

Betz, Office Action, U.S. Appl. No. 11/356,842, Mar. 5, 2009, 19 pgs.

Betz, Office Action, U.S. Appl. No. 11/356,842, Jul. 9, 2010, 36 pgs.

Betz, Office Action, U.S. Appl. No. 11/356,842, Oct. 14, 2008, 18 pgs.

Betz, Office Action, U.S. Appl. No. 11/356,842, Apr. 15, 2008, 14 pgs.

Betz, Office Action, U.S. Appl. No. 11/356,842, Oct. 30, 2009, 24 pgs.

Betz, Office Action, U.S. Appl. No. 11/394,508, Dec. 8, 2009, 14 pgs.

Betz, Office Action, U.S. Appl. No. 11/394,508, Apr. 15, 2008, 14 pgs.

Betz, Office Action, U.S. Appl. No. 11/394,508, Oct. 17, 2008, 18 pgs.

Betz, Office Action, U.S. Appl. No. 12/939,981, Dec. 9, 2010, 12 pgs.

Betz, Office Action, U.S. Appl. No. 11/394,508, May 28, 2009, 20 pgs.

Betz, Office Action, U.S. Appl. No. 13/585,775, Aug. 8, 2013, 7 pgs.

Brill et al:, An analysis of the askMSR question-answering system,Proceedings of the Conference on Empirical Methods in Natural Language Processing (EMNLP) Jul. 2002, pp. 257-264.

Brin, Extracting patterns and relations from the world wide web, 1999, 12 pgs.

Brin, The anatomy of a large-scale hypertextual search engine, Apr. 14-18, 1998, 26 pgs.

Bunescu, R., et al: Using encyclopedia knowledge for named entity disambiguation, Department of Computer Science, University of Texas, retrieved from the internet, Dec. 28, 2006, 8 pgs.

Chang, C. et al: IEPAD: Information extraction based on pattern discovery, WWW10, AMC, May 1-5, 2001, pp. 681-688.

Chaudhuri, Robust and Efficient Fuzzy Match for Online Data Cleaning, SIGMOD 2003, San Diego, CA Jun. 9-12, 2003, 12 pgs.

Chen: A scheme for inference problems using rough sets and entropy, Lecture notes in Computer Science, vol. 3642/2005, Regina, Canada Aug. 31-Sep. 3, 2005, 10 pgs.

Chen, Exploiting Relationships for Object Consolidation, IQIS'05, Baltomore, MD, Jun. 2005, 12 pgs.

Cheng, Entropy-based subspace clustering for mining numerical data, 1999.

Chu-Carroll, J. et al., A multi-strategy and multi-source approach to question answering, 2006, 8 pgs.

Cover, Entropy, relative entropy and mutual information, Chapter 2 Elements of Information Theory, 1991, 13 pgs.

Craswell, N., et al: Effective site finding using link anchor information, SIGIR'01, Sep. 9-12, 2001, 8 pgs.

Czuba, Final Office Action, U.S. Appl. No. 11/833,180, May 7, 2013, 27 pgs.

Czuba, Notice of Allowance, U.S. Appl. No. 11/833,180, Oct. 4, 2013, 11 pgs.

Czuba, Notice of Allowance, U.S. Appl. No. 11/833,180, Jan. 31, 2014, 9 pgs.

(56) References Cited

OTHER PUBLICATIONS

Czuba, Office Action, U.S. Appl. No. 11/833,180, Sep. 2, 2009, 17 pgs.
Czuba, Office Action, U.S. Appl. No. 11/833,180, May 10, 2010, 19 pgs.
Czuba, Office Action, U.S. Appl. No. 11/833,180, Aug. 28, 2012, 25 pgs.
Czuba, Office Action, U.S. Appl. No. 11/833,180, Feb. 28, 2012, 21 pgs.
Czuba, Office Action, U.S. Appl. No. 11/833,180, Dec. 29, 2010, 22 pgs.
Dean, J. et al.: MapReduce: Simplified data processing on large clusters, OSDI Dec. 6-8, 2004, 13 pgs.
Dey, A distance-based approach to entity reconciliation in heterogeneous databases, May/Jun. 2002.
Dong, X. et al.: Reference reconciliation in complex information spaces, SIGACM-SIGMOD, 2005, 12 pgs.
Downey, D.: Learning text patterns for web information extraction and assessment, American Association for Artificial Intelligence, 2002, 6 pgs.
Etzioni, O. et al., Web-scale information extraction in knowitall (preliminary results), WWW04, AMC, May 17-22, 2004, 11 pgs.
Freitag, D. et al.: Boosted wrapped induction, American Association of Artificial Intelligence, 2000, 7 pgs.
Gao, X., et al.: Learning information extraction patterns from tabular web pages without manual labelling, Proceedings of the IEEE/WIC Int'l Conf. on Web Intelligence (WI'03), Oct. 13-17, 2009, 4 pgs.
Google, ISR/WO, PCT/US2006/007639, Sep. 13, 2006, 5 pgs.
Google, ISR/WO, PCT/US2006/019807, Dec. 18, 2006, 4 pgs.
Google, ISR/WO, PCT/US2007/061156, Feb. 11, 2008, 5 pgs.
Gray, R.M.: Entropy and information theory, Springer-Verlag, NY, NY, 1990, 30 pgs.
Guha, R. et al., Disambiguating people in search, WWW04, AMC, May 17-20, 2004, 9 pgs.
Guha,R, Object co-identification on the semantic web, WWW04, AMC, May 17-22, 2004, 9 pgs.
Haveliwala, T.H.: Topic-sensitive pagerank, Proceedings of the 11th Int'l World Wide Web Conference, Honolulu, Hawaii, May 7-11, 2002, 23 pgs.
Hogue, Examiner's Answer, U.S. Appl. No. 11/142,748, Oct. 3, 2011, 23 pgs.
Hogue, Office Action, U.S. Appl. No. 11/142,748, Dec. 7, 2007, 13 pgs.
Hogue, Office Action, U.S. Appl. No. 11/142,748, Jul. 13, 2010, 12 pgs.
Hogue, Office Action, U.S. Appl. No. 11/142,748, Aug. 17, 2009, 14 pgs.
Hogue, Office Action, U.S. Appl. No. 11/142,748, Nov. 17, 2010, 14 pgs.
Hogue, Office Action, U.S. Appl. No. 11/142,748, May 18, 2007, 9 pgs.
Hogue, Office Action, U.S. Appl. No. 11/142,748, Jul. 22, 2008, 18 pgs.
Hogue, Office Action, U.S. Appl. No. 11/142,748, Aug. 23, 2007, 13 pgs.
Hogue, Office Action, U.S. Appl. No. 11/142,748, Jan. 27, 2009, 17 pgs.
Hogue, Tree pattern inference and matching for wrapper induction on the world wide web, Jun. 2004, 106 pgs.
Information entropy, Wikipedia, May 3, 2006, 9 pgs.
Information theory, Wikipedia, May 3, 2006, 12 pgs.
Jeh, Scaling personalized web search, May 20-24, 2003, 24 pgs.
Ji, Re-ranking algorithms for name tagging, Jun. 2006, 8 pgs.
Jones: Bootstrapping for text learning tasks, 1999, 12 pgs.
Koeller: Approximate matching of textual domain attributes for information source integration, Jun. 17, 2005, 10 pgs.
Kolodner: Indexing and retrieval strategies for natural language fact retrieval, ACM Trans. Database System 8.3, Sep. 1983, 31 pgs.
Kosseim,L., Answer formulation for question-answering, Oct. 1, 2007, 11 pgs.
Liu, B., Mining data records in web pages, Conference 00, ACM, 2000, 10 pgs.
MacKay, D.J.C.: Information theory, inference and learning algorithms, Cambridge University Press, 2003, pp. 22-33, 138-140.
Mann, G., et al.: Unsupervised personal name disambiguation, Proceedings of the Seventh Conference on Natural Language Learning at HLT_NAACL, 2003, 8 pgs.
McCallum, et al., Object consolidation by graph partitioning with a conditionally-trained distance metric, SIGKDD 03, ACM, Aug. 24-27, 2003, 6 pgs.
Merriam Webster Dictionary defines "normalize" as "to make conform to or reduce to a norm or standard", 1865, 2 pgs.
Microsoft Computer Dictionary defines "normalize" as "adjust number within specific range", May 1, 2002, 4 pgs.
Microsoft Computer Dictionary defines "quantity" as a "number", May 1, 2002, 4 pgs.
Microsoft Computer Dictionary defines "value" as a "quantity", May 1, 2002, 4 pgs.
Mihalcea, R. et al., PageRank on semantic networks with application to word sense disambiguation, Aug. 23-27, 2004, 7 pgs.
Mihalcea, R. et al., TextRank: bringing order into texts, Jul. 2004, 8 pgs.
Page,L., et al: The pagerank citation ranking: bringing order to the web, Stanford Digital Libraries Working Paper, 1998, 17 pgs.
Pawson D.: Sorting and grouping, www.dpawson.uk.xsl/sect2/N6280.html Feb. 7, 2004, 19 pgs.
Petrovic, Office Action, U.S. Appl. No. 11/768,877, Mar. 8, 2010, 28 pgs.
Petrovic, Office Action, U.S. Appl. No. 11/768,877, Aug. 20, 2010, 36 pgs.
Prager, J. et al., IBM's piquant in TREC2003, Nov. 18-21, 2003, 10 pgs.
Prager, H. et al., Question answering using constraint satisfaction: QA-by-dossier-with-constraints, 2004, 8 pgs.
Ramakrishnan, G. et al., Is question answering an acquired skill?, WWW04, ACM, May 17-22, 2004, 10 pgs.
Reynar, Office Action, U.S. Appl. No. 11/692,475, Jul. 9, 2009, 12 pgs.
Richardson, M. et al.: Beyond page rank: machine learning for static ranking, International World Wide Web Conference Committee May 23, 2006, 9 pgs.
Richardson, M. et al.: The intelligent surfer: probabilistic combination of link and content information in page rank, Advance in Neural Information Processing System, vol. 14, MIT Press, Cambridge, MA, 2002, 8 pgs.
Riloff, E., et al: Learning dictionaries for information extraction by multi-level bootstrapping, American Association for Artificial Intelligence, 1999, 6 pgs.
Shannon, C.E. et al.: A mathematical theory of communication, The Bell System Technical Journal, vol. 27, Jul., Oct. 1948, 55 pgs.
Sun Microsystems: Attribute Names, Online: http://java.sun.com/products/jndi/tutorial/basics/directory/attrnames.html, Feb. 17, 2004, 2 pgs.
Vespe, Office Action, U.S. Appl. No. 11/745,605, Apr. 8, 2010, 15 pgs.
Vespe, Office Action, U.S. Appl. No. 11/745,605, Jul. 30, 2009, 17 pgs.
Wang, Y. et al.: C4-2: Combining link and contents in clustering web search results to improve information interpretation, The University of Tokyo, 2002, 9 pgs.
Wirzenius, Lars,: C preprocessor trick for implementing similar data types, Jan. 17, 2000, 9 pgs.
Zhao, Office Action, U.S. Appl. No. 11/940,177, Jan. 4, 2010, 7 pgs.

\* cited by examiner

Example Format of Facts in Repository (each fact is associated with an object ID)

Example Facts in Repository (each fact is associated with an object ID)

Example Object
Reference Table

Example Format of Facts in
Repository (each fact is associated
with an object ID)

Example Objects

| Object ID \ Attribute | Name | Date of Birth | Address | Phone Number | Date of Death |
|---|---|---|---|---|---|
| O1 | John W. Henry | 1960 | | (719) 123-4567 | |
| O2 | John Henry | 03/09/1976 | 4089 Iron Works Parkway, Lexington, KY 40511 | (859) 233-4303 | |
| O3 | Mr. Henry, John | | Lamar, CO 81052 | 719-123-4567 | |
| O4 | Senator John Henry | November 1750 | | | December 16, 1798 |
| O5 | John F. Kennedy | 05/29/1917 | | | 12/22/1963 |
| O6 | President John F. Kennedy | May 29, 1917 | | | November 22, 1963 |

*FIG. 5(a)*

| Object ID | Normalized Name Value |
|---|---|
| O1 | john w. henry |
| O2 | john henry |
| O3 | mr. henry, john |
| O4 | senator john henry |
| O5 | john f. kennedy |
| O6 | president john f. kennedy |

*FIG. 5(b)*

| Object ID | Normalized Name Value |
|---|---|
| O1 | john w. henry |
| O2 | john henry |
| O3 | henry, john |
| O4 | john henry |
| O5 | john f. kennedy |
| O6 | john f. kennedy |

*FIG. 5(c)*

| Object ID | Normalized Name Value |
|---|---|
| O1 | henry john |
| O2 | henry john |
| O3 | henry john |
| O4 | henry john |
| O5 | john kennedy |
| O6 | john kennedy |

*FIG. 5(d)*

| Normalized Name Value that Bucket Index is Based on | Object IDs of Objects Included in the Bucket |
|---|---|
| Henry john | O1, O2, O3, O4 |
| John kennedy | O5, O6 |

*FIG. 5(e)*

ENTITY NORMALIZATION VIA NAME NORMALIZATION

RELATED APPLICATIONS

This application is a continuation of U.S. patent application Ser. No. 11/394,508, now U.S. Pat. No. 8,700,568, entitled "Entity Normalization Via Name Normalization," by Jonathan T. Betz, filed on Mar. 31, 2006, which is a continuation-in-part of U.S. patent application Ser. No. 11/356,838, now U.S. Pat. No. 7,672,971, entitled "Modular Architecture For Entity Normalization," by Jonathan T. Betz and Farhan Shamsi, filed on Feb. 17, 2006. All above-identified patents and/or patent applications are hereby incorporated by reference in its entirety.

This application potentially relates to the following U.S. Applications, all of which are incorporated by reference herein: U.S. application Ser. No. 11/366,162, entitled "Generating Structured Information," filed Mar. 1, 2006, by Egon Pasztor and Daniel Egnor; U.S. application Ser. No. 11/357,748, entitled "Support for Object Search," filed Feb. 17, 2006, by Alex Kehlenbeck, Andrew W. Hogue; U.S. application Ser. No. 11/342,290, entitled "Data Object Visualization," filed on Jan. 27, 2006, by Andrew W. Hogue, David Vespe, Alex Kehlenbeck, Mike Gordon, Jeffrey C. Reynar, David Alpert; U.S. application Ser. No. 11/342,293, entitled "Data Object Visualization Using Maps," filed on Jan. 27, 2006, by Andrew W. Hogue, David Vespe, Alex Kehlenbeck, Mike Gordon, Jeffrey C. Reynar, David Alpert; U.S. application Ser. No. 11/356,679, entitled "Query Language," filed Feb. 17, 2006, by Andrew W. Hogue, Doug Rohde; U.S. application Ser. No. 11/356,837, entitled "Automatic Object Reference Identification and Linking in a Browseable Fact Repository," filed Feb. 17, 2006, by Andrew W. Hogue; U.S. application Ser. No. 11/356,851, entitled "Browseable Fact Repository," filed Feb. 17, 2006, by Andrew W. Hogue, Jonathan T. Betz; U.S. application Ser. No. 11/356,842, entitled "ID Persistence Through Normalization," filed Feb. 17, 2006, by Jonathan T. Betz, Andrew W. Hogue; U.S. application Ser. No. 11/356,728, entitled "Annotation Framework," filed Feb. 17, 2006, by Tom Richford, Jonathan T. Betz; U.S. application Ser. No. 11/341,069, entitled "Object Categorization for Information Extraction," filed on Jan. 27, 2006, by Jonathan T. Betz; U.S. application Ser. No. 11/356,838, entitled "Modular Architecture for Entity Normalization," filed Feb. 17, 2006, by Jonathan T. Betz, Farhan Shamsi; U.S. application Ser. No. 11/356,765, entitled "Attribute Entropy as a Signal in Object Normalization," filed Feb. 17, 2006, by Jonathan T. Betz, Vivek Menezes; U.S. application Ser. No. 11/341,907, entitled "Designating Data Objects for Analysis," filed on Jan. 27, 2006, by Andrew W. Hogue, David Vespe, Alex Kehlenbeck, Mike Gordon, Jeffrey C. Reynar, David Alpert; U.S. application Ser. No. 11/342,277, entitled "Data Object Visualization Using Graphs," filed on Jan. 27, 2006, by Andrew W. Hogue, David Vespe, Alex Kehlenbeck, Mike Gordon, Jeffrey C. Reynar, David Alpert; U.S. application Ser. No. 11/394,610, entitled "Determining Document Subject by Using Title and Anchor Text of Related Documents," filed on Mar. 31, 2006, by Shubin Zhao; U.S. application Ser. No. 11/394,552, entitled "Anchor Text Summarization for Corroboration," filed on Mar. 31, 2006, by Jonathan T. Betz and Shubin Zhao; and U.S. application Ser. No. 11/394,414, entitled "Unsupervised Extraction of Facts," filed on Mar. 31, 2006, by Jonathan T. Betz and Shubin Zhao.

TECHNICAL FIELD

The disclosed embodiments relate generally to fact databases. More particularly, the disclosed embodiments relate to identifying duplicate objects in an object collection.

BACKGROUND

Data is often organized as large collections of objects. When objects are added over time, there are often problems with data duplication. For example, a collection may include multiple objects that represent the same entity. As used herein, the term "duplicate objects" refers to objects representing the same entity. The names used to describe the represented entity are not necessarily the same among the duplicate objects.

Duplicate objects are undesirable for many reasons. They increase storage cost and take a longer time to process. They lead to inaccurate results, such as an inaccurate count of distinct objects. They also cause data inconsistency.

Conventional approaches identifying duplicate objects assume a homogeneity in the input set of objects (all books, all products, all movies, etc). Identifying duplication for objects of different type requires looking at different fields for different type. For example, when identifying duplicate objects in a set of objects representing books, traditional approaches match the ISBN value of the objects; when identifying duplicate objects in objects representing people, traditional approaches match the SSN value of the objects. One drawback of the conventional approaches is that they are only effective for specific types of objects, and tend to be ineffective when applied to a collection of objects with different types. Also, even if the objects in the collection are of the same type, these approaches tend to be ineffective when the objects include incomplete or inaccurate information.

What is needed is a method and system that identifies duplicate objects in a large number of objects having different types and/or incomplete information.

SUMMARY

The invention is a system and method for identifying duplicate objects from a plurality of objects. For each object, the name used to describe the represented entity is normalized. A signature is generated for each object based on the normalized name. Objects are grouped into buckets based on the signature of the objects. Objects within the same bucket are compared to each other using a matcher to identify duplicate objects. The matcher can be selected from a collection of matchers.

This approach normalizes names used by objects to describe the represented entity. Therefore, objects representing the same entity share the same normalized name. As a result, this approach can identify duplicate objects even if the associated names initially are different. This approach is also computationally cost-efficient because objects are pairwise matched only within a bucket, rather than being pairwise matched across all buckets.

These features and benefits are not the only features and benefits of the invention. In view of the drawings, specification, and claims, many additional features and benefits will be apparent.

BRIEF DESCRIPTION OF THE DRAWINGS

FIGS. 5(a)-(e) illustrate an example of identifying duplicate objects, in accordance with a preferred embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

System Architecture

Figure 1:
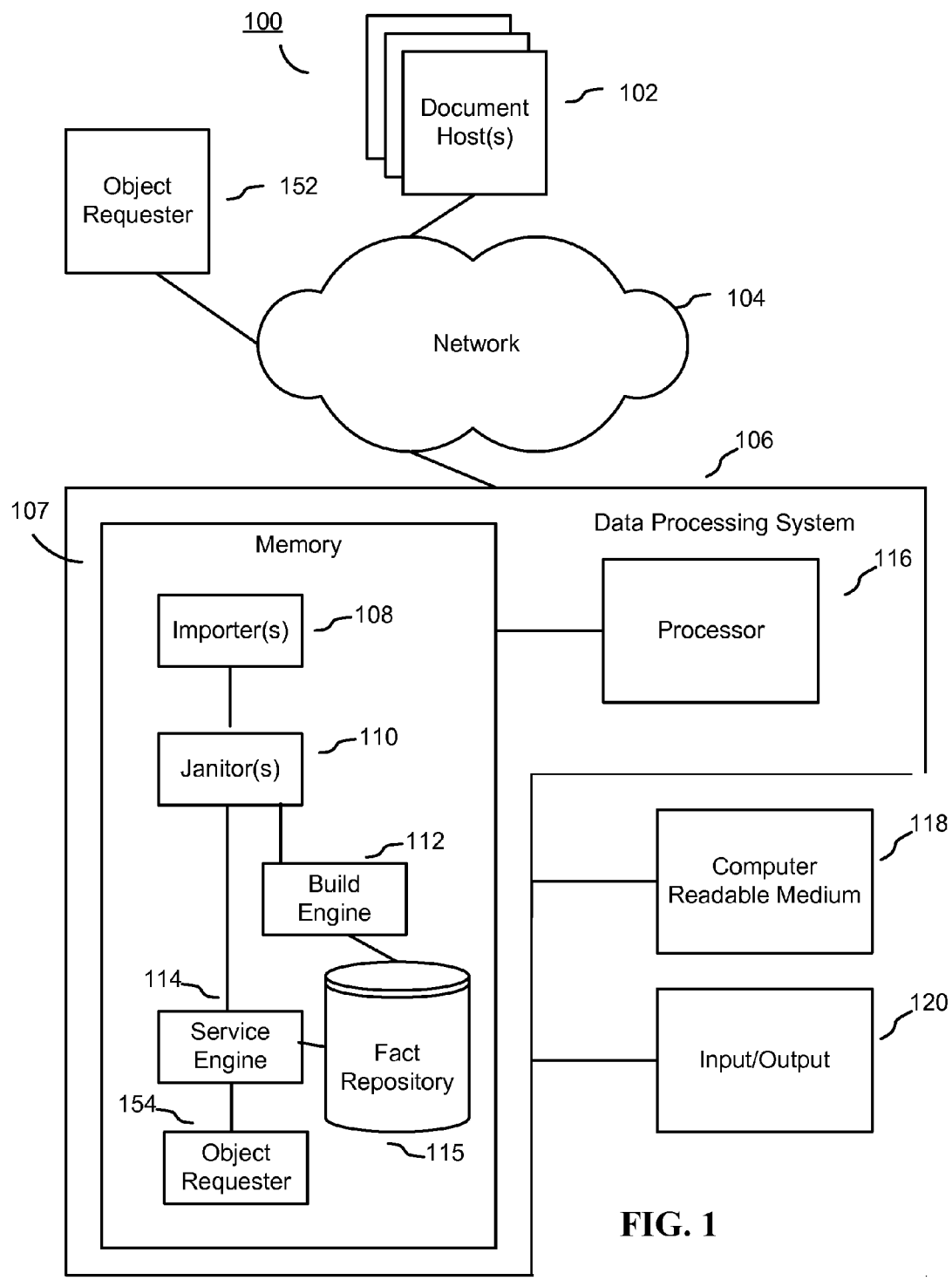
FIG. 1 shows a network, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in an interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "December 2, 1981." Birthday and Date of Birth might both be rewritten as Birthdate by one janitor and then another janitor might notice that 12/2/1981 and December 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Data Structure

Figure 2A:
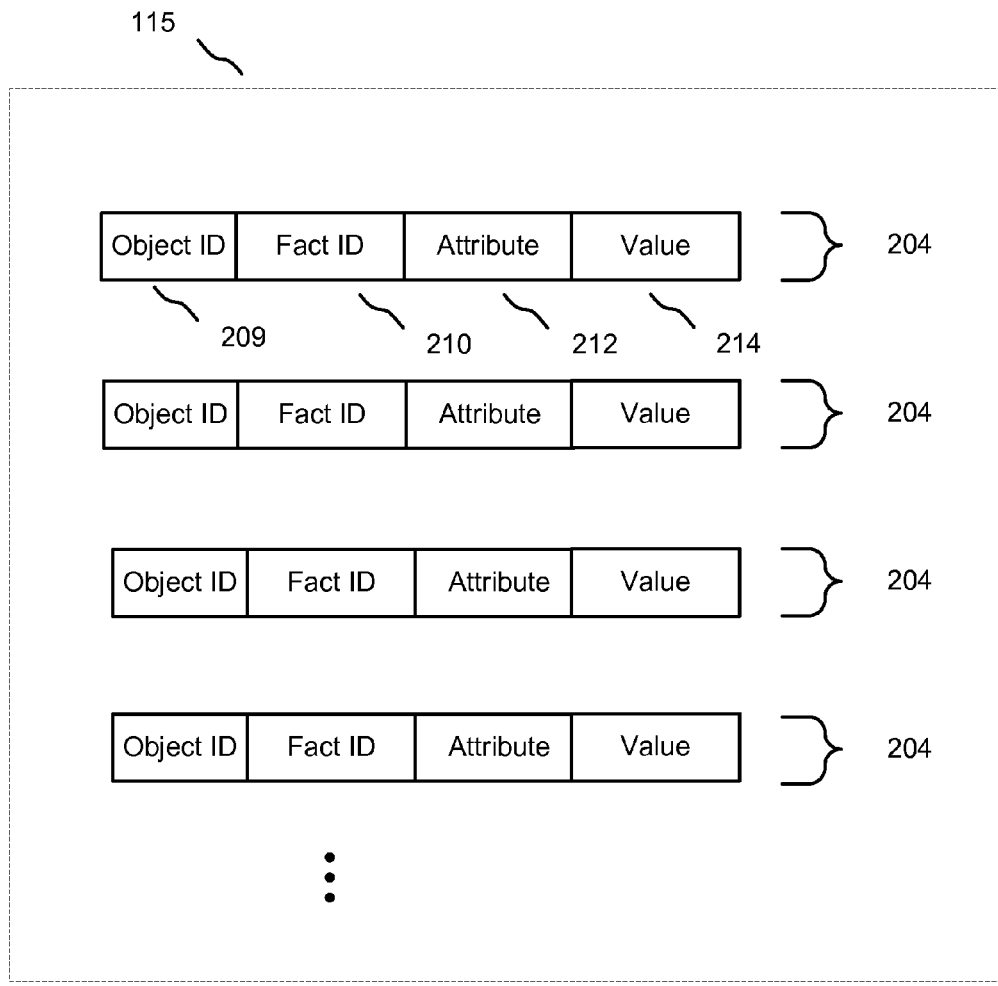
FIGS. 2(a)-2(d) are block diagrams illustrating a data structure for facts within a repository of FIG. 1 in accordance with preferred embodiments of the invention.

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "February 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
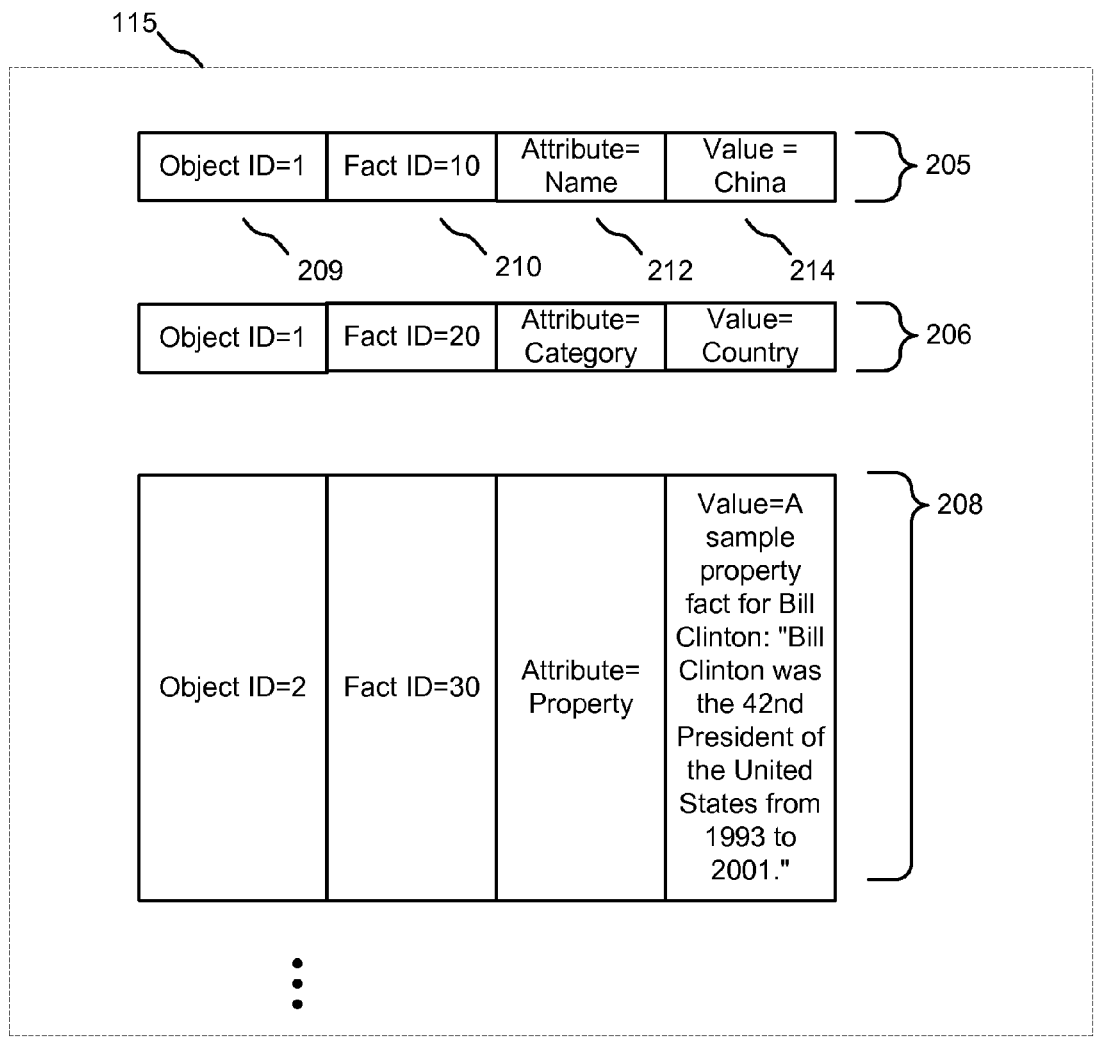

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
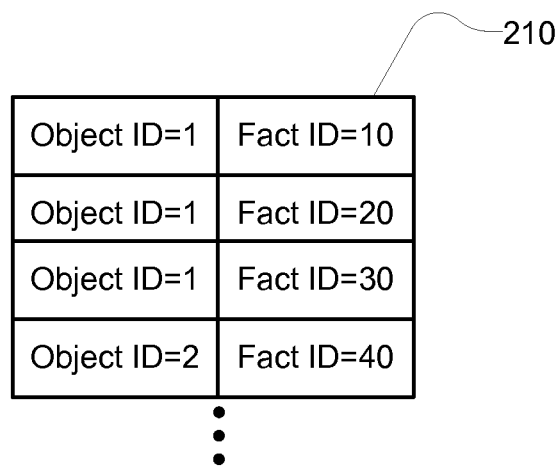

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
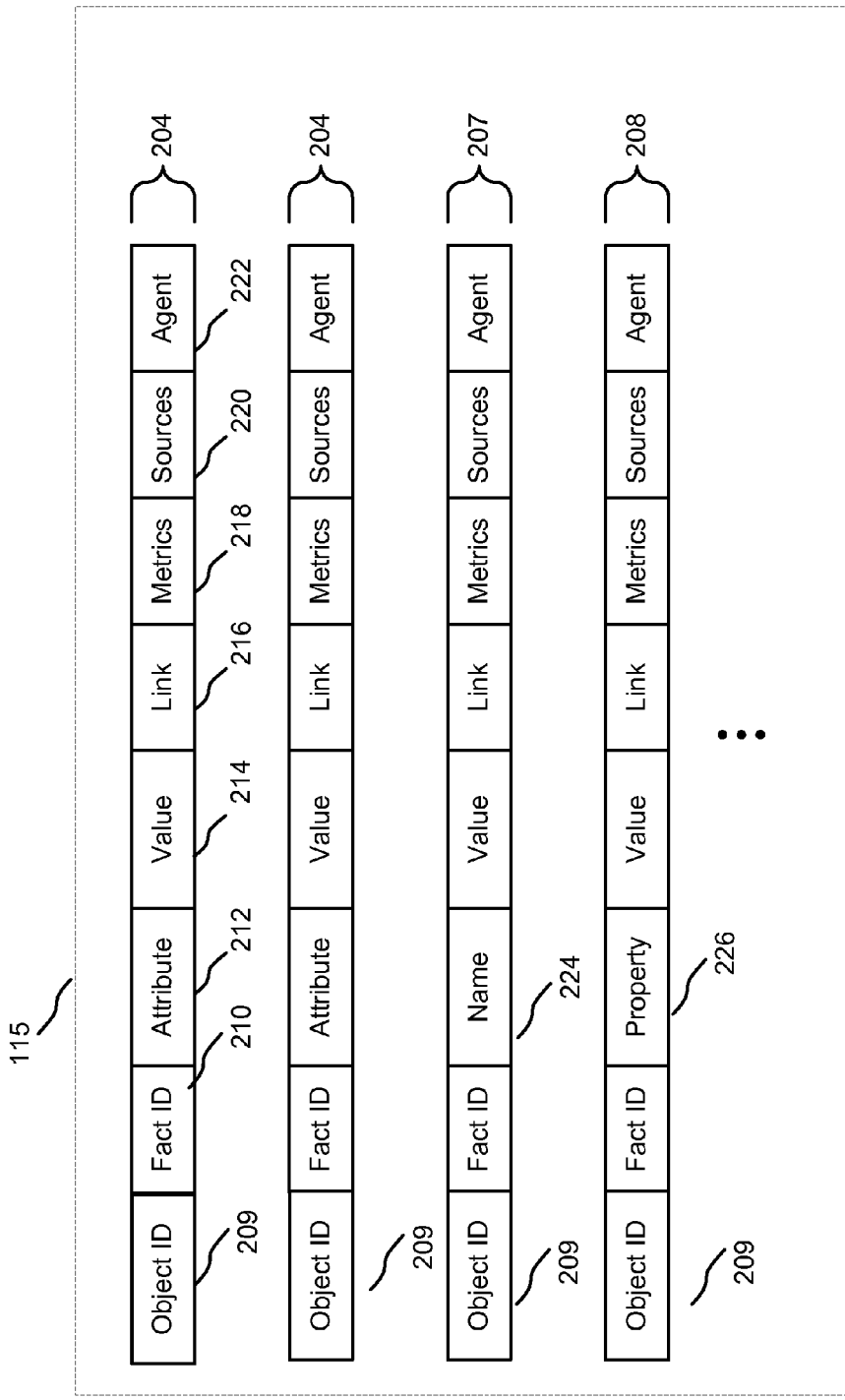

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest.

For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2E:
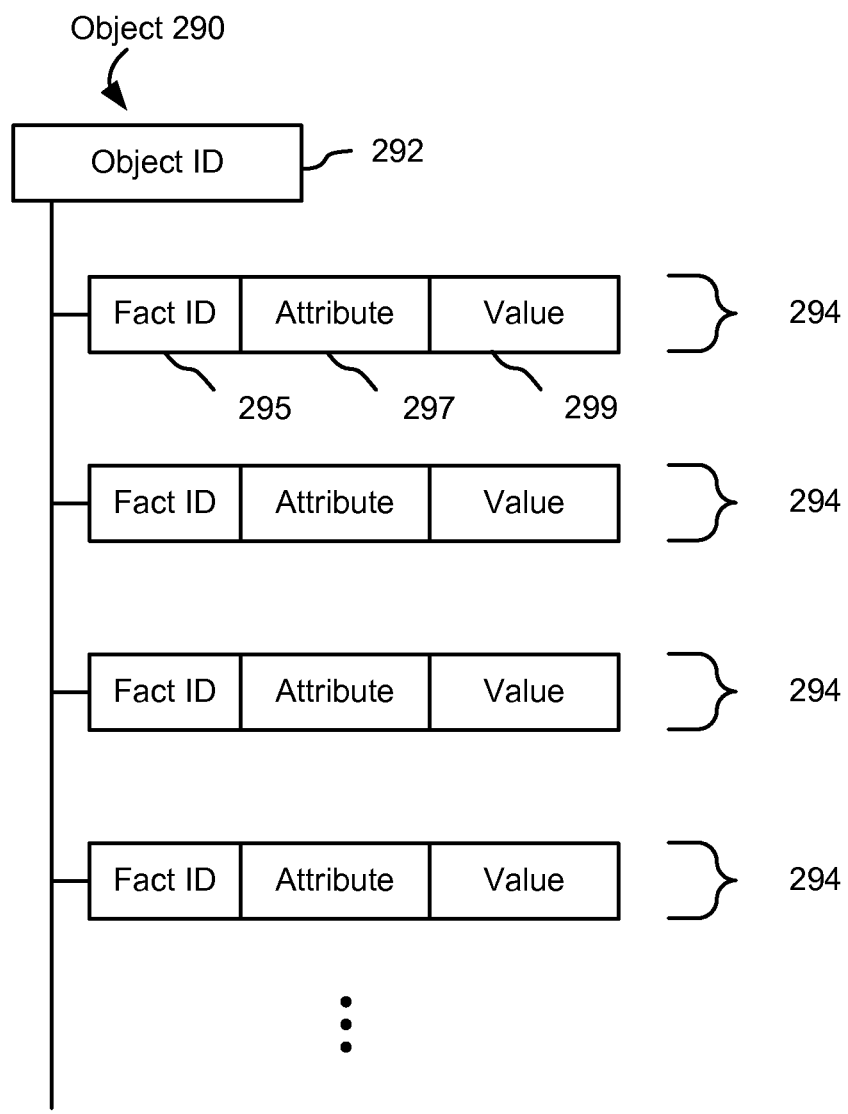
FIG. 2(e) is a block diagram illustrating an alternate data structure for facts and objects in accordance with preferred embodiments of the invention.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Overview of Methodology

Figure 3:
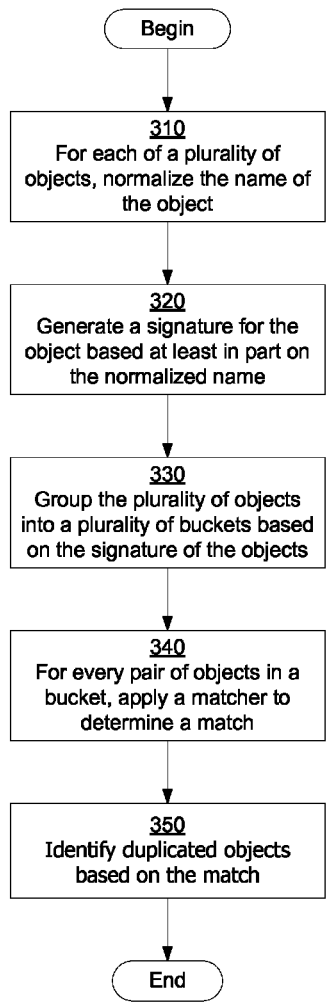
FIG. 3 is a flowchart of an exemplary method for identifying duplicate objects in accordance with a preferred embodiment of the invention.

Referring now to FIG. 3, there is shown a flow diagram depicting a method for identifying duplicate objects in accordance with a preferred embodiment of the invention. The steps of the process illustrated in FIG. 3 may be implemented in software, hardware, or a combination of hardware and software.

In one embodiment, the present invention is implemented in a janitor 110 to identify duplicate objects so that the duplicate objects can be merged together. Duplicate objects are objects representing the same entity but having a different object ID. Janitor 110 examines object reference table 210, and reconstructs the objects based on the associations between object IDs and fact IDs maintained in object reference table 210. Alternatively, janitor 110 can retrieve objects by asking service engine 114 for the information stored in repository 115. Depending how object information is stored in repository 115, janitor 110 needs to reconstruct the objects based on the facts and object information retrieved.

The flowchart shown in FIG. 3 will now be described in detail, illustrated by the diagram in FIG. 4 and the example in FIGS. 5(a)-(e). The process commences with a set of objects that may contain duplicate objects. For example, there may be multiple objects that represent the entity U.S. President George Washington. Each object has an associated set of facts. As illustrated in FIG. 2(a), each fact 204 has an attribute 212 and a value 214 (also called fact value).

As shown in FIG. 5(a), objects O1 and O3 are duplicate objects representing the same entity, a Mr. John W. Henry living in Lamar Colo. 81052. O1 is associated with three facts with the following attributes: name, date of birth, and phone number. O3 is associated with three facts: name, address, and phone number. Object O2 represents a race horse named John Henry. O2 is associated with four facts: name, date of birth, address, and phone number (the phone number of the horse park where the race horse lives). Object O4 represents a Senator John Henry. O4 is associated with three facts: name, date of birth, and date of death. Objects O5 and O6 are duplicate objects representing US President John F. Kennedy. O5 is associated with three facts: name, date of birth, and date of death. O6 is also associated with three facts: name, date of birth, and date of death. Note that among the duplicate objects, there are considerable variations in the associated name values. A name value is the value of a name fact, a fact with attribute name. A preferred embodiment of the present invention can be used on collections of objects numbering from tens of thousands, to millions, or more.

Figure 4:
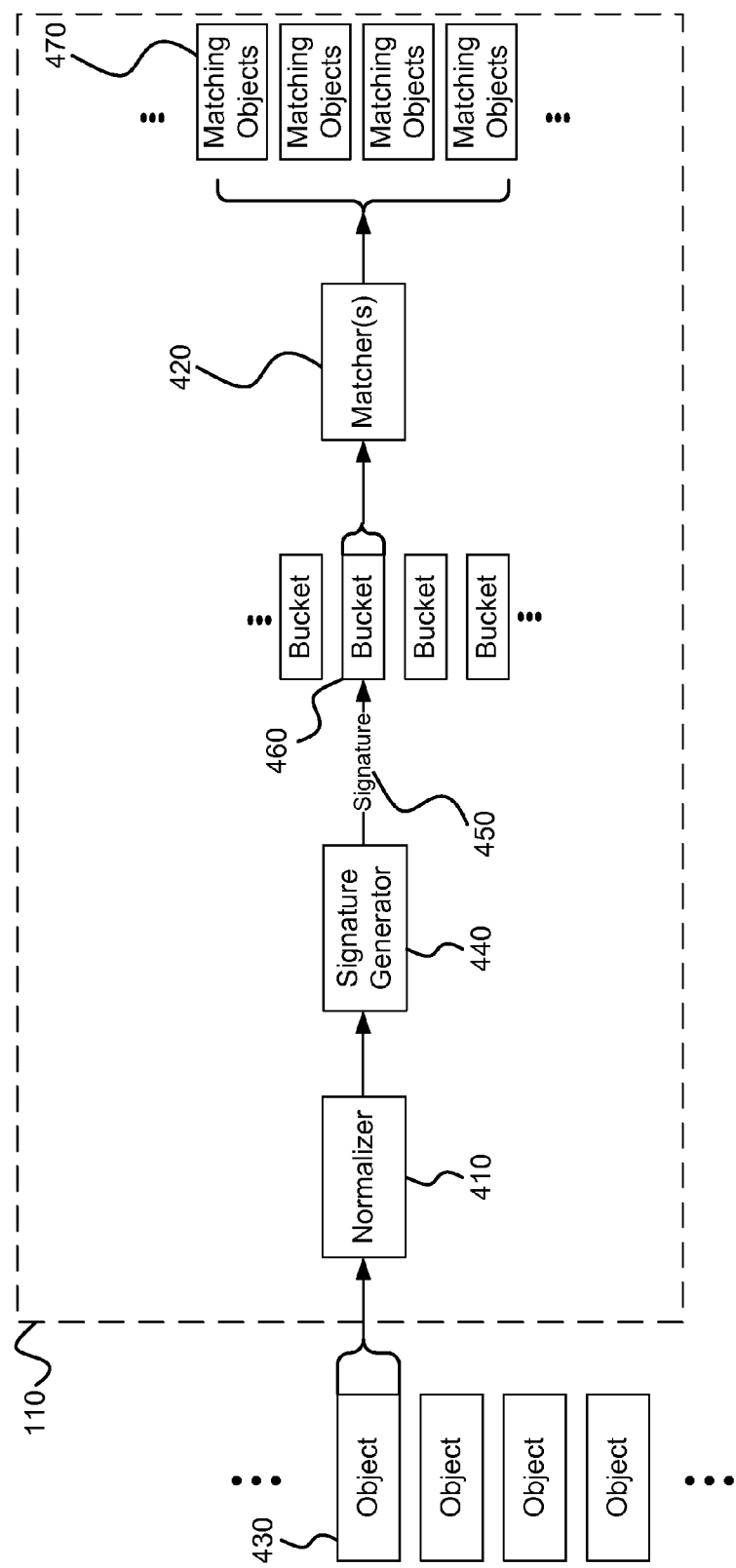
FIG. 4 is a simplified diagram illustrating an object being processed for identification of its duplicate objects in accordance with a preferred embodiment of the invention.

Referring to FIGS. 3 and 4, for each object 430, janitor 110 normalizes the associated name value by calling a normalizer 410. As observed above, there are considerable variations in the name values associated with duplicate objects. Normalizer 410 is designed to standardize the name values such that the normalized name values of duplicate objects are the same. It is noted that the above normalization rules can be applied to fact values other than the name values.

In one embodiment, normalizer 410 normalizes a name value by applying a set of normalization rules to the name value. A normalization rule can remove from the name value information unnecessary to describe the represented entity (e.g., removing the from the United States). Alternatively, a normalization rule can standardize the format of the name value (e.g., changing a person's name from a last name first order to a first name first order, such as from Washington, George to George Washington). Some of the normalization rules are language specific while others are universally applicable to name values in different languages. Some embodiments allow a name fact to indicate that the associated name value is an exception to one or more of the normalization rules. When normalizer 410 identifies such indication it will not apply the normalization rules indicated. For example, an object with a name value of J. F. K. may indicate that the associated name value is an exception to a single-letter-word removal rule.

One example of the normalization rules, uppercase-to-lowercase conversion rule, converts uppercase characters in a name value to corresponding lowercase characters, such as from "America" to "america." The name values of some duplicate objects may use capital characters to describe the represented entity while the name values of others may ignore capital characters. For example, one object representing the Apple computer iMac may have a name value of iMac, while other objects representing the same entity may have a name value of Imac, imac, or IMAC. Each of the above four distinct name values describes the same entity— the Apple computer iMac. By applying the uppercase-to-lowercase conversion rule, all four name values are standardized to be imac. Applying the uppercase-to-lowercase conversion rule to the name values of the set of objects illustrated in FIG. 5(a), the resulting normalized name values are shown in FIG. 5(b).

Another example of the normalization rules, stop-words removal rule, removes stop words from name values. Stop words are small or frequently used words that are generally overlooked by the search engines. Common stop words are words such as the, a, an, this, and that. Stop words tend to convey no additional value in describing the represented entity, therefore the name values of some objects include stop words while the name values of others do not. For example, for two duplicate objects describing the United Nations, one may have a name value of the United Nations while the other may have a name value of United Nations. By applying the above stop-words-removal rule, the two duplicate objects' name values are standardized to be United Nations. Normalizer 410 can dynamically update the collection of words it deems as stop words.

Another example of the normalization rules, social-titles removal rule, removes social titles from name values. Social titles are identifying appellations signifying status of the entity described. Common social titles are words such as Mr., Ms., Mrs., Miss, Sir, etc. Because social titles are not essential in identifying the represented entity, the name values of some objects do not include them. For example, for two duplicate objects representing the English mathematician and physicist Isaac Newton, one may have a name value of Sir Isaac Newton while the other may have a name value of Isaac Newton. By applying the above social-titles removal rule, the two duplicate objects' name values are standardized to be Isaac Newton. Similarly, the normalization rules can include a honorific-titles removal rule which removes honorific words such as General, President, Congressman, Senator from the name values.

Applying the uppercase-to-lowercase conversion rule to the normalized name values shown in FIG. 5(b), the resulting normalized name values are shown in FIG. 5(c). Normalizer 410 removes the social title mr. from the normalized name value of O3. Similarly, normalizer 410 removes the honorific-titles senator and president from the normalized name values of O4 and O6 accordingly.

Another example of the normalization rules, single-letter-word removal rule, removes single letter words from name values. When identifying an entity, certain non-essential words are often omitted or only shown their initial characters. One example of such non-essential words is a person's middle name. Some objects representing a person includes the person's middle name initial in the associated name value while others do not. For example, for two duplicate objects representing a John Henry, one may have a name value of John W. Henry while the other may have a name value of John Henry. By applying the above single-letter-word removal rule and a punctuation-marks removal rule as described below, the two duplicate objects' name values are standardized to be John Henry.

Another example of the normalization rules, alphabetic sort rule, sorts the words in a name value in alphabetic order. When identifying an entity, the name of the entity can be in one of several different formats. For example, China can be either called People's Republic of China or China, People's Republic. Also, a person can either be addressed in a first-name first way or in a more formal last-name first way. Correspondingly, for two duplicate objects representing a person named John Henry, the name value of one object can be John Henry while the name value of the other can be Henry, John. By applying the alphabetic sort rule and a punctuation-marks removal rule as described below, the two duplicate objects' name values are standardized to be Henry John.

Yet another example of the normalization rules, punctuation-marks removal rule, removes punctuation marks from name values. Punctuation marks are used to clarify meaning by indicating separation of words into clauses and phrases. Because punctuation marks are not essential in identifying an entity, some objects omit them in the associated name values. Also, punctuation marks in a fact value may become unnecessary after normalizer 410 applies one or more normalization rules to the fact value. For example, after applying the alphabetic sorting rule to a name value of Henry, Bill, the name value becomes Bill Henry, and the comma mark becomes unnecessary. The punctuation removal rule removes the extra comma sign and standardizes the name value to be Bill Henry.

Applying the single-letter-word removal rule, the alphabetic sort rule, and the punctuation-marks removal rule to the normalized name values shown in FIG. 5(c), the resulting normalized name values are shown in FIG. 5(d). The normalized name value of O1 first becomes john . henry after normalizer 410 applies the single-letter-word removal rule, then becomes henry john . after the alphabetic sort rule, and eventually becomes henry john after the punctuation-marks removal rule removes the period mark. Similarly, the normalized name values of O2, O3, and O4 become henry john, and those of O5 and O6 become john kennedy.

Referring to FIGS. 3 and 4, janitor 110 generates 320 a signature 450 for object 430 by calling a signature generator 440. Signature generator 440 is a function/module designed to generate an identical signature for duplicate objects even if the facts associated with the objects are not duplicates. Janitor 110 then groups 330 objects 430 into a plurality of buckets 460 in the following fashion. Janitor 110 puts an object 430 into an existing bucket 460 indexed by signature 450. If there is no such bucket 460 then a new bucket 460 is created, the signature 450 is assigned as the index of the bucket 460, and the object 430 is put into the bucket 460. When all objects 430 are processed, those objects sharing a signature are in the same bucket.

The purpose of generating a signature is to optimize the object normalization process. In general, normalizing a repository of objects requires comparing all possible pairs of objects in the repository, which is computationally impractical for a large collection of objects. As an optimization, it's desirable to design the signature generator 440 to always create the same signature for duplicate objects. As a result, only objects sharing the same signature need to be compared to identify duplicate objects and normalize the repository of objects. In order for the signature generator 440 to always create the same signature for duplicate objects, it needs to be inclusive and ignore minor differences among the objects.

In one embodiment, signature generator 440 generates 320 signatures 450 based solely on the name values of objects 430. For example, signature generator 440 can generate 320 the signature 450 by removing any white space in the name value of object 430. Janitor 110 then places object 430 into a bucket 460 in accordance with signature 450.

It is noted that signatures 450 generated by signature generator 440 can be a null signature, a signature with an empty value. In one embodiment, janitor 110 does not place an object 430 with a null signature into any bucket 460. As a result, objects with null signatures are neither compared nor merged with other objects. Signature generator 440 can generate a null signature because the object does not have a name fact. Signature generator 440 can also generate a null signature because the normalized name value of the object is empty (e.g., the original name value consists only of stop words, and the normalizer 410 removes all the stop words from the name value). Alternatively, the signature generator 440 can purposefully generate a null signature for certain objects to prevent the objects from being considered for merger.

FIG. 5(e) shows in which buckets the objects 430 ultimately placed. Applying the above signature generator 440, objects O1 to O4 are properly grouped into a bucket indexed by a signature 450 based on henry john, the normalized name value of objects O1-O4. Objects O5 and O6 are placed in a bucket indexed by a signature 450 based on john kennedy, the normalized name value of both objects.

Alternatively, signature generator 440 can generate 320 signatures 450 based on a combination of name values and other fact values of the associated objects 430. In one example, the signature generator 440 applies some normalization rules similar to the ones described above to the other fact values before generating 320 the signature 450.

By normalizing 310 the name values of each object, janitor 110 can detect duplicate objects with different name values describing the same represented entity. Objects 430 created from different data sources may not share the same name value, even if they represent the same entity. For example, an object 430 representing George Washington created based on a webpage devoted to his childhood may have a name value of George Washington, while another object 430 also representing George Washington created based on a webpage dedicated to his years of presidency probably would have a different name value of President George Washington. By normalizing the name values of each object, janitor 110 can standardize the name values such that objects representing the same entity share the same normalized name value. For example, the normalizes name value of both of the above objects are george washington.

Because signature 450 is based on the normalized name value, signature generator 440 generates the same signature 450 for duplicate objects. Because janitor 110 groups objects 430 based on their associated signatures, duplicate objects tend to be grouped 330 into the same bucket 460. For example, as illustrated in FIG. 5(e), duplicate objects O1 and O3 are placed in the same bucket and duplicate objects O5 and O6 are placed in the same bucket.

After all objects are grouped 430 into buckets 460, for every bucket 460 created, janitor 110 applies 340 a matcher 420 to every two objects in bucket 460, and identifies 350 the matching objects 470 as duplicate objects. Matcher 420 is designed to match duplicate objects based on the similarity of facts with the same attribute associated with the two objects (also called simply common facts). Similarity between two corresponding facts can be determined in a number of ways. For example, two facts are determined to be similar when the fact values are identical. In another example, two facts can be determined to be similar when the fact values are lexically similar, such as "U.S.A." and "United States." Alternatively, two facts are determined to be similar when the fact values are proximately similar, such as "176 pounds" and "176.1 pounds." In another example, two facts are determined to be similar when the fact values are similar based on string similarity measure (e.g., edit distance, Hamming Distance, Levenshtein Distance, Smith-Waterman Distance, Gotoh Distance, Jaro Distance Metric, Dice's Coefficient, Jaccard Coefficient to name a few).

For example, matcher 420 determines whether two objects match based on the number of common facts with similar values (also called simply similar common facts) and the number of common facts with values that are not similar (also called simply dissimilar common facts). In one such matcher 420, two objects are deemed to match when there is more similar common fact than dissimilar common facts. Because the name values are used to generate 320 the signatures of each object 430, matcher 420 does not consider name fact when determining whether two objects match.

When the above matcher 420 is applied to the buckets shown in FIG. 5(*e*), O1 and O3 are determined to match because they have one similar common fact: the fact with attribute phone number, and no dissimilar common facts. O5 and O6 are also determined to match because there are two similar common facts: the facts associated with attributes of date of birth and date of death, and no dissimilar common facts. It is noted that matcher 420 ignores the format difference between the fact value associated with attribute phone number of O1 ((719) 123-4567) and O3 (719-123-4567). Similarly, the format difference between the fact value associated with attributes of date of birth and date of death of O5 and O6 is also ignored by matcher 420. As a result, the janitor 110 properly identifies O1 and O3 as duplicate objects and O5 and O6 as duplicate objects. More examples of how to determine whether two objects are duplicate objects can be found in U.S. Utility patent application Ser. No. 11/356,838, for "Modular Architecture For Entity Normalization," by Jonathan Betz, et al., filed Feb. 17, 2006.

In another embodiment, janitor 110 does not first apply matcher 420 to every two objects in bucket 460 and then identify matching objects 470 as duplicate objects. Instead, janitor 110 applies matcher 420 to two objects in bucket 460. If matcher 420 indicates the two objects to be matching objects 470, janitor 110 merges them, keeps the merged object in bucket 460, and removes the other object(s) out of bucket 460. Then, janitor 110 restarts the process by applying matcher 420 to two objects in bucket 460 that have not been matched before. This process continues until matcher 420 has been applied to every pair of objects in bucket 460.

Janitor 110 can merge two objects in several different ways. For example, janitor 110 can choose one of the two objects as the merged object, add facts only present in the other object to the merged object, and optionally reconcile the dissimilar common facts of the merged object. Alternatively, janitor 110 can create a new object as the merged object, and add facts from the two matching objects to the merged object.

In another embodiment, a matcher 420 can be a function or a module. The system selects matcher 420 from a collection of matcher functions/modules. The collection of matcher functions/modules includes functions/modules provided by a third party and functions/modules previously created. By providing the ability to select a matcher 420, janitor 110 can reuse the existing well-tested functions/modules, and select matcher 420 based on the specific needs.

There are many ways for janitor 110 to select a matcher function/module. For example, janitor 110 can select matcher 420 based on system configuration data. Alternatively, the selection can be determined at run time based on information such as grouper 410 selected. For example, if the resulting buckets of grouper 410 include many objects, janitor 110 selects a matcher function/module requiring a higher entropy threshold.

After identifying 350 the matching objects as duplicate objects, janitor 110 can merge the duplicate objects into a merged object, so that each entity is represented by no more than one object and each fact that is associated with a same entity will have the same object ID.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of identifying duplicate objects in a plurality of objects, wherein each object in the plurality of objects is associated with one or more facts, and each of the one or more facts has an attribute and a value, the method comprising using a computer processor to perform:

associating facts extracted from web documents with the plurality of objects;

for each of the plurality of objects, normalizing a value of a name fact, the name fact being among one or more facts associated with the object;

based on the normalized values of the name facts, grouping the plurality of objects into a plurality of buckets, each object in a bucket having the same normalized value of a name fact;

processing the plurality of objects in a bucket to identify at least one pair of duplicate objects in the plurality of objects in the bucket, based on a similarity of values of facts other than the name fact for the objects in the bucket; and merging the duplicate objects together, the merging including removing one of the duplicate objects from a memory repository.

2. The method of claim 1, wherein normalizing the value of the name fact comprises:

normalizing the value of the name fact by applying a group of normalization rules to the value of the name fact.

3. The method of claim 2, wherein the group of normalization rules comprises at least one rule selected from one of:

removing social titles; and removing predefined adjective words.

4. The method of claim 2, wherein the group of normalization rules comprises sorting the value of the name fact in alphabetic order.

5. The method of claim 1, wherein the grouping comprises:

generating a signature for each of the plurality of objects based at least in part on the normalized value of the name fact of each of the plurality of objects; and responsive to an identifier of an existing bucket being the same as the signature of an object, adding the object to the existing bucket, otherwise establishing a new bucket including the object, an identifier of the new bucket being same as the signature of the object.

6. The method of claim 1, wherein processing the plurality of objects includes: applying a matcher to a pair of objects in one of the plurality of buckets.

7. The method of claim 6, wherein applying the matcher to a pair of objects in one of the plurality of buckets comprises:

for each common fact of the pair of objects, determining a similarity of the values of the common fact based on a similarity measure; and determining that the pair of objects are duplicates based on the similarity.

8. The method of claim 7, wherein determining that the pair of objects are duplicates comprises:
determining that the pair of objects are duplicates based on the number of the common facts with similar values and the number of common facts.

9. The method of claim 6, wherein applying the matcher comprises:
applying the matcher to each pair of objects in one of the plurality of buckets to determine if the pair of objects are duplicates.

10. The method of claim 6, further comprising:
selecting the matcher from a collection of matchers, wherein applying the matcher includes applying the selected matcher to a pair of objects in one of the plurality of buckets to determine if the pair of objects are duplicates.

11. A system for identifying duplicate objects in a plurality of objects, wherein each object in the plurality of objects is associated with one or more facts, and each of the one or more facts has an attribute and a value, the system comprising:
memory;
one or more processors; and
one or more programs stored in the memory and configured for execution by the one or more processors, the one or more programs including instructions for:
associating facts extracted from web documents with the plurality of objects;
for each of the plurality of objects, normalizing a value of a name fact, the name fact being among one or more facts associated with the object;
based on the normalized values of the name facts, grouping the plurality of objects into a plurality of buckets, each object in a bucket having the same normalized value of a name fact;
processing the plurality of objects in a bucket to identify at least one pair of duplicate objects in the plurality of objects in the bucket, based on a similarity of values of facts other than the name fact for the objects in the bucket; and
merging the duplicate objects together, the merging including removing one of the duplicate objects from a memory repository.

12. The system of claim 11, wherein normalizing the value of the name fact comprises:
normalizing the value of the name fact by applying a group of normalization rules to the value of the name fact.

13. The system of claim 12, wherein the group of normalization rules comprises at least one rule selected from one of:
removing social titles; and
removing predefined adjective words.

14. The system of claim 12, wherein the group of normalization rules comprises sorting the value of the name fact in alphabetic order.

15. A non-transitory computer readable storage medium storing one or more programs for identifying duplicate objects in a plurality of objects, wherein each object in the plurality of objects is associated with one or more facts, and each of the one or more facts has an attribute and a value, the one or more programs comprising instructions for:
associating facts extracted from web documents with the plurality of objects;
for each of the plurality of objects, normalizing a value of a name fact, the name fact being among one or more facts associated with the object;
based on the normalized values of the name facts, grouping the plurality of objects into a plurality of buckets, each object in a bucket having the same normalized value of a name fact;
processing the plurality of objects in a bucket to identify at least one pair of duplicate objects in the plurality of objects in the bucket, based on a similarity of values of facts other than the name fact for the objects in the bucket; and
merging the duplicate objects together, the merging including removing one of the duplicate objects from a memory repository.

16. The non-transitory computer readable storage medium of claim 15, wherein normalizing the value of the name fact comprises:
normalizing the value of the name fact by applying a group of normalization rules to the value of the name fact.

17. The non-transitory computer readable storage medium of claim 16, wherein the group of normalization rules comprises at least one rule selected from one of:
removing social titles; and
removing predefined adjective words.

18. The non-transitory computer readable storage medium of claim 16, wherein the group of normalization rules comprises sorting the value of the name fact in alphabetic order.

* * * * *